US010086318B2

(12) United States Patent
Eleftherakis et al.

(10) Patent No.: US 10,086,318 B2
(45) Date of Patent: Oct. 2, 2018

(54) FILTER WITH INTERNAL FRAME OPENINGS

(71) Applicant: Filtran LLC, Des Plaines, IL (US)

(72) Inventors: John G. Eleftherakis, Cary, IL (US); Ibrahim Khalil, Lake Barrington, IL (US)

(73) Assignee: FILTRAN LLC, Des Plaines, IL (US)

( * ) Notice: Subject to any disclaimer, the term of this patent is extended or adjusted under 35 U.S.C. 154(b) by 87 days.

(21) Appl. No.: 14/066,851

(22) Filed: Oct. 30, 2013

(65) Prior Publication Data

US 2015/0114897 A1    Apr. 30, 2015

(51) Int. Cl.
| | | |
|---|---|---|
| *B01D 29/00* | (2006.01) | |
| *B01D 29/56* | (2006.01) | |
| *B01D 29/07* | (2006.01) | |
| *B01D 35/147* | (2006.01) | |
| *B01D 29/11* | (2006.01) | |
| *B01D 35/027* | (2006.01) | |
| *B01D 35/157* | (2006.01) | |
| *B01D 29/54* | (2006.01) | |
| *F01M 11/00* | (2006.01) | |
| *F16H 57/04* | (2010.01) | |
| *F16N 39/06* | (2006.01) | |

(52) U.S. Cl.
CPC ............ *B01D 29/07* (2013.01); *B01D 29/111* (2013.01); *B01D 29/54* (2013.01); *B01D 35/0273* (2013.01); *B01D 35/147* (2013.01); *B01D 35/1576* (2013.01); *F01M 11/0004* (2013.01); *F16H 57/0404* (2013.01); *B01D 2201/127* (2013.01); *F01M 2011/007* (2013.01); *F16N 2039/065* (2013.01)

(58) Field of Classification Search
CPC .. B01D 35/147; B01D 2313/04; B01D 29/56; B01D 29/00; B01D 29/016; B01D 29/0097; B01D 2013/08; B01D 2313/083
See application file for complete search history.

(56) References Cited

U.S. PATENT DOCUMENTS

| | | | |
|---|---|---|---|
| 1,729,135 A | | 9/1929 | Slauson |
| 3,317,046 A | * | 5/1967 | Landree et al. .............. 210/130 |
| 6,177,010 B1 | | 1/2001 | Schamel et al. |
| 8,038,877 B2 | | 10/2011 | Stausberg et al. |

(Continued)

FOREIGN PATENT DOCUMENTS

| | | |
|---|---|---|
| DE | 102006004575 | 11/2006 |
| EP | 0634299 | 1/1995 |

(Continued)

OTHER PUBLICATIONS

International Search Report and Written Opinion from related PCT Appln. No. PCT/US14/62997 dated Jan. 9, 2015.

(Continued)

*Primary Examiner* — Robert Clemente
*Assistant Examiner* — Akash K Varma
(74) *Attorney, Agent, or Firm* — Grossman, Tucker, Perreault & Pfleger, PLLC

(57) ABSTRACT

At least one embodiment of the invention pertains to a fluid filter having a fine media element and a coarse media element inside a housing. The fine media element has a plurality of apertures through a flange around the periphery of the fine media element.

19 Claims, 5 Drawing Sheets

(56) References Cited

U.S. PATENT DOCUMENTS

| | | | |
|---|---|---|---|
| 2006/0180541 A1* | 8/2006 | Hueppchen | B01D 35/0273 210/450 |
| 2007/0029237 A1 | 2/2007 | Crawford et al. | |
| 2007/0125698 A1* | 6/2007 | Merritt et al. | 210/450 |
| 2008/0035587 A1* | 2/2008 | Wieczorek et al. | 210/791 |
| 2009/0229458 A1 | 9/2009 | Feddersen et al. | |
| 2013/0008845 A1 | 1/2013 | Saito et al. | |
| 2013/0118964 A1 | 5/2013 | Dedering | |

FOREIGN PATENT DOCUMENTS

| | | |
|---|---|---|
| EP | 2586511 | 5/2013 |
| JP | 2000-185207 | 7/2000 |
| JP | 2009-8071 | 1/2009 |

OTHER PUBLICATIONS

Office Action from related Chinese Appln. No. 201480059579.7, dated May 3, 2017. English translation attached.
Extended European Search Report from related EPO Appln. No. 14857092.2, dated May 29, 2017.
English translation of an Office Action from related Japanese Appln. No. 2016-527383, dated Jul. 31, 2018.

* cited by examiner

FILTER WITH INTERNAL FRAME OPENINGS

FIELD

Various embodiments of the invention pertain to fluid filters, including for example filters for vehicle oils such as transmission oils.

BACKGROUND

Vehicle parts such as engines and transmissions are often used with various oils or other internal fluids. Various filters are known to remove contaminants or other materials from the fluids. In the case of transmissions, for example filters having a housing that encloses a filter media such as a felt like media are used, with the fluid passing through the media under pressure or suction applied to the filter on the inlet or outlet side.

When the fluid is at a colder temperature, some fluids become highly viscous and thus may create a large pressure drop compared to warm operation.

SUMMARY OF THE INVENTION

Accordingly, some embodiments provide a filter having a fine media and a coarse media, with a bypass of the fine media.

In one aspect, a fluid filter is provided comprising a housing having an inlet and an outlet: and a fine media element disposed in the housing, the fine media element having a fine media and a plurality of apertures therethrough so that all fluid flowing through the filter passes through either the fine media or the apertures.

In another aspect, a fluid filter is provided comprising a housing having an inlet and an outlet, a fine media element disposed in the housing, the fine media element having a fine media and a plurality of apertures therethrough so that all fluid flowing through the filter passes through either the fine media or the apertures, wherein the fine media element is an overmolded pleat pack, and wherein the fine media element has a peripheral flange and the apertures are disposed on the peripheral flange; and a coarse media element disposed in the housing, the coarse media element having a coarse media so that all fluid flowing through the filter passes through the coarse media.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

In the following description, certain terminology is used to describe certain features of one or more embodiments of the invention. Some embodiments will now be described by way of example, with like reference numbers referring to like parts throughout.

Figure 1:
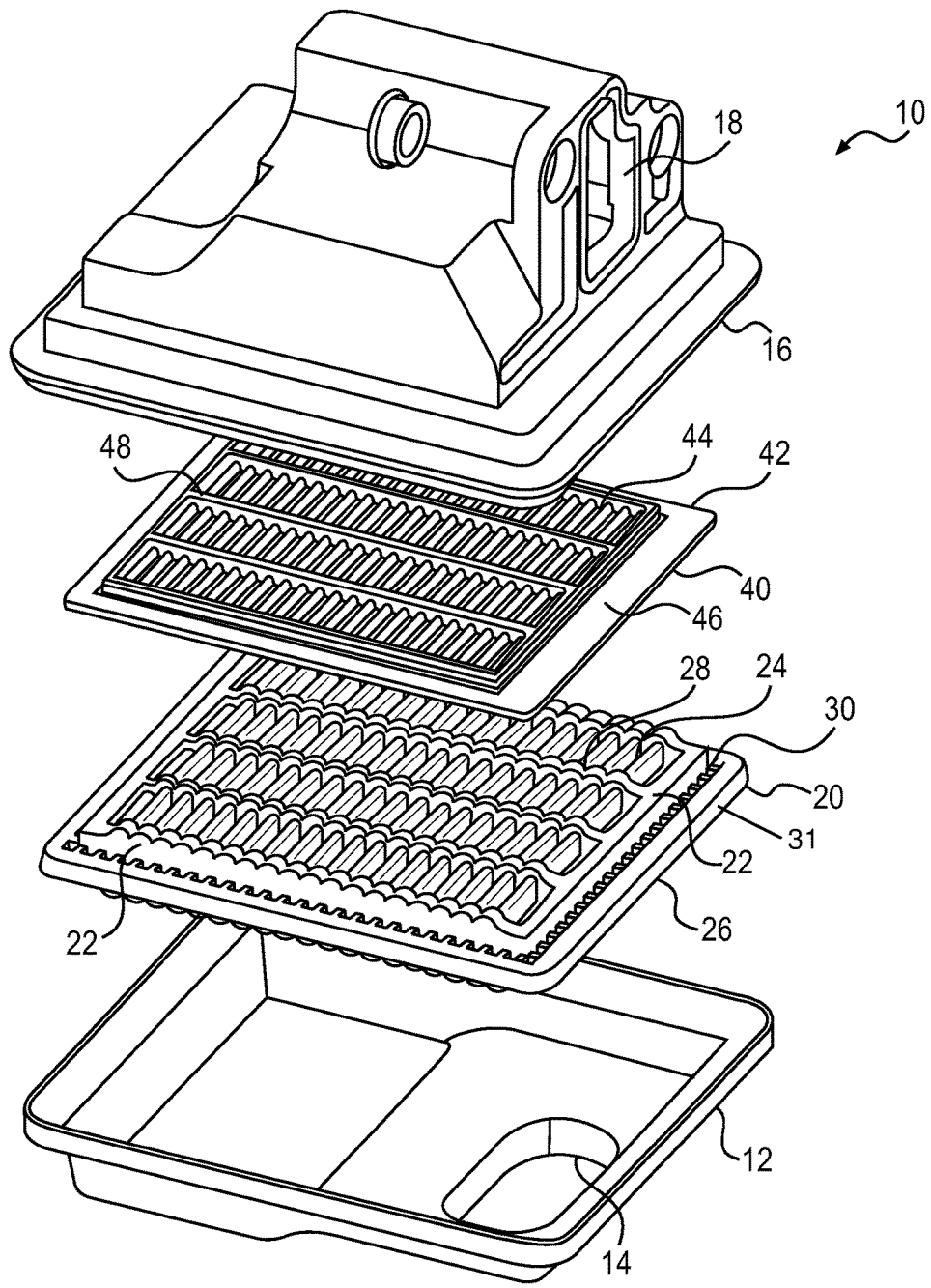
FIG. 1 is an exploded view of a filter according to an embodiment.
Figure 2:
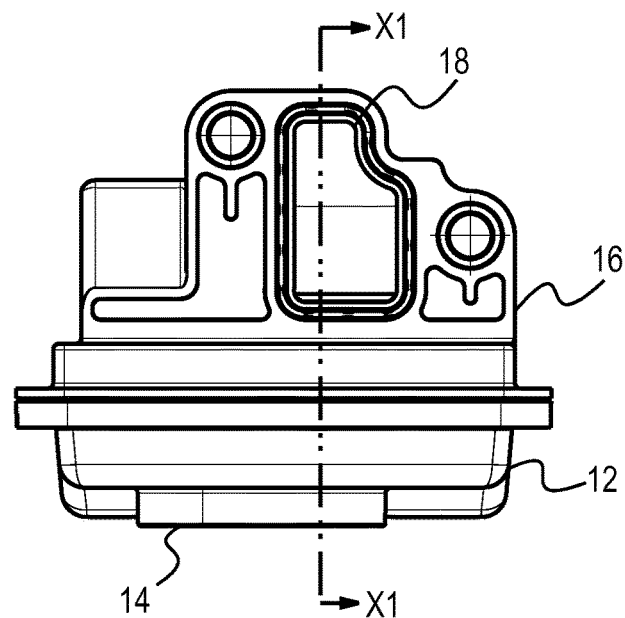
FIG. 2 is a side view of the filter.
Figure 3:
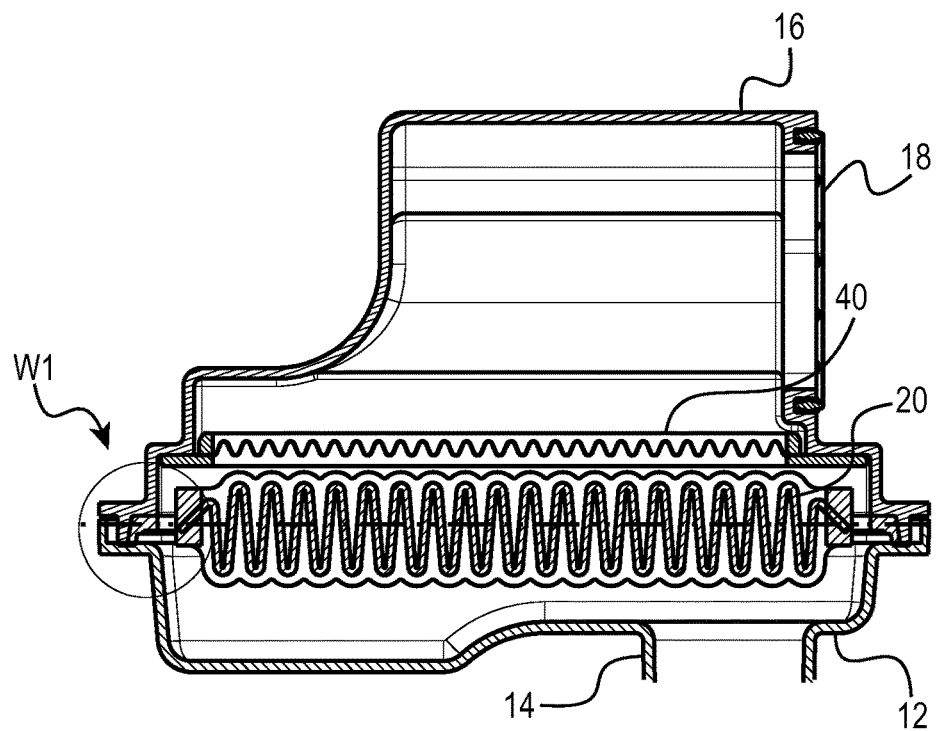
FIG. 3 is a cross sectional view of the filter taken through line X1 of FIG. 2.
Figure 4:
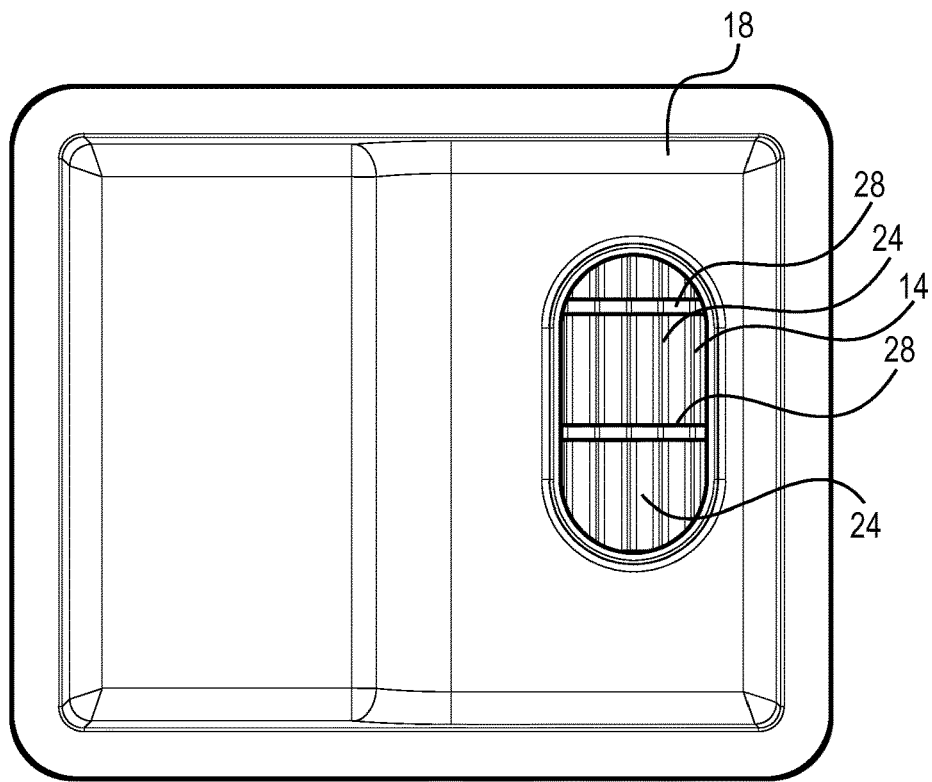
FIG. 4 is a bottom view of the filter.
Figure 5:
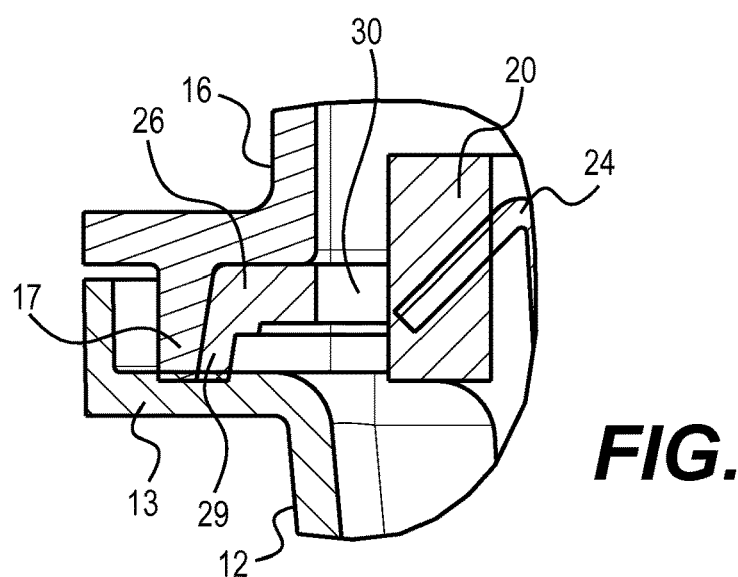
FIG. 5 is a detail view taken of the area W1 of FIG. 3.
Figure 6:
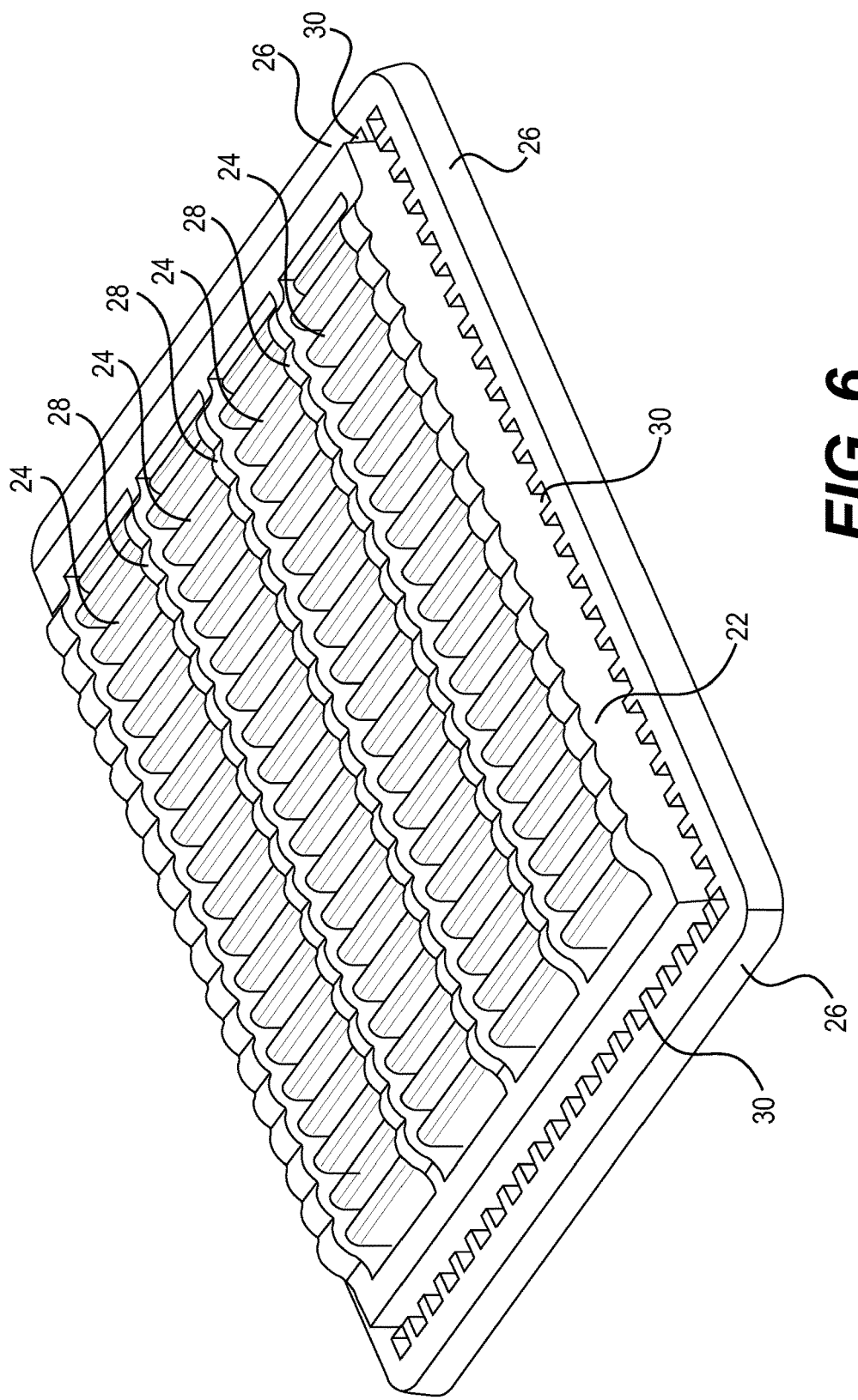
FIG. 6 is a perspective view of a fine pleat pack.
Figure 7:
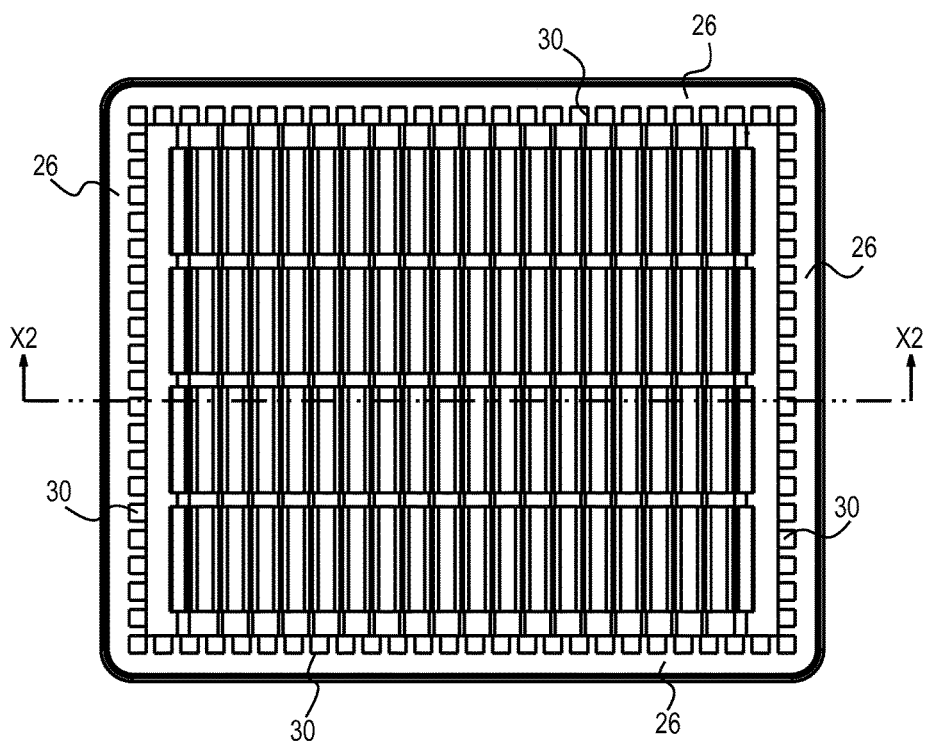
FIG. 7 is a top view of a fine pleat pack.
Figure 8:
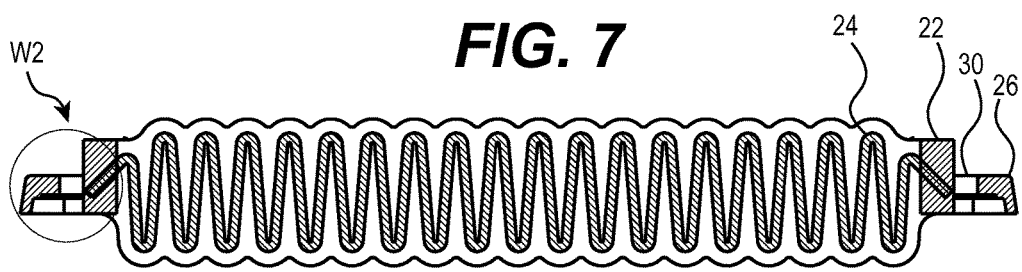
FIG. 8 is a cross sectional view of the fine pleat pack taken through line X2 of FIG. 7.

FIG. 1 depicts a filter 10 according to an example of an embodiment. The filter 10 has a lower housing 12 that has an inlet 14, and an upper housing 16 that has an outlet 18. Each housing 12 and 16 may also be referred to as a respective housing shell. The upper and lower housings 12 and 16 are joined together at their peripheral edges to form an enclosed chamber. FIGS. 3 and 5 show an example of such joining, in which a flange 13 of the lower housing 12 and a flange 17 of the upper housing 16 are laser welded to form a sealed attachment between the housings 12 and 16. Other methods of attachment and sealing such as gluing, bonding or friction or vibration welding may be used, for example.

Returning to FIG. 1, a fine filter element 20 is mounted in the chamber. The fine filter 20 in this example is a pleat pack type. The fine filter 20 has an inner peripheral frame 22 that includes sidewalls and internal stiffening ribs 28 that are overmolded onto and around a fine media 24. In this example the fine media 24 may be a high-efficiency media and/or a "microblast" media or a blend of those or other media, and may be of a felt type or other general style. The fine media is pleated in this example but could also be flat or otherwise bent or curved. In this example the fine media 24 has a pleated or folded configuration which increases surface area for a given footprint compared to a flat media in the same footprint. The inner peripheral frame 22 is unitary with an outer peripheral frame 26 and internal stiffening ribs 28.

FIGS. 1, 3 and 5 show an example where the outer peripheral frame 26 has a peripheral flange body 31 that is trapped between the joined areas of the housings 12 and 26 and may be also attached to 3 the lower housing 12, such as by vibration welding or any other method such as those described above. A plurality of peripheral flange elements 33 extend inwardly from the peripheral flange body 31 and are coupled to an outward facing surface of at least one of the sidewalls of the inner peripheral frame 22.

Figure 9:
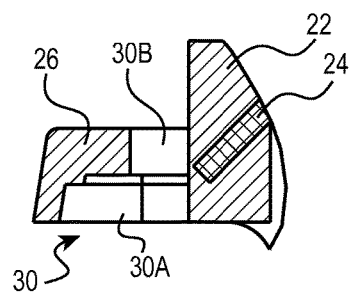
FIG. 9 is a detail view of the area W2 of FIG. 8.

As seen particularly in FIGS. 5, 6, 7 and 9, the outer peripheral frame 26 has a plurality of apertures 30 therethrough. In the illustrated example the apertures 30 are regularly spaced, substantially square holes all the way around the inner perimeter of the outer peripheral frame 26, so that in this example the apertures 30 are disposed around the four sidewalls of the inner peripheral frame 22. However the apertures 30 may have other shapes and may be irregularly arranged, and may be only between one or more sidewalls of the inner peripheral frame 22 and the outer peripheral frame 26. In an embodiment not shown in the figures, apertures such as apertures 30 could also or alternatively be placed through internal ribs such as the stiffening ribs 28. FIG. 9 shows an example of the apertures 30 in detail, which include in this example a larger open region 30A and a smaller open region 30B.

FIGS. 1 and 3 in particular depict a coarse filter element 40. In this example, the coarse filter element 40 is a pleat pack type with a frame 42 overmolded onto a coarse media 44 with a peripheral frame 46 and internal stiffening ribs 48. In this example the coarse media 44 may be a screen or mesh such as a wire mesh and/or a coarse felt media or a blend of those or other media. The coarse media 44 and fine media 24 are selected so that the coarse media 44 creates a lower pressure drop to fluid flowing therethrough than the pressure drop created by the fine media 24 to the same fluid flowing therethrough, although in some aspects the fine media 24 may provide more complete filtration effects than the coarse media 44. The coarse media 44 is pleated in this example but could also be flat or otherwise bent or curved. FIG. 3 shows the peripheral frame 46 being positioned against and mounted to the upper housing 14. This may be done by bonding, laser welding or other methods such as a mechanical fit.

Although the fine filter element 20 and the coarse filter element 40 in this example are both shown as being a pleat pack type, in other examples one or both filter elements 20 and 40 may be of a flat or other type. Also although the fine filter element 20 is shown upstream of the coarse filter element 40 so that the fine filter element 20 is closer to the inlet side of the direction of the flow and the coarse filter element 40 is closer to the outlet side of direction of flow, this arrangement can be reversed to place the coarse filter element 40 upstream.

In operation the apertures 30 can in some examples have some or many advantages. The apertures 30 may be considered in some cases as flow control openings, in that fluid being filtered will flow through them. In cold conditions, when the fluid is more viscous, some or all of the fluid, depending on pressure and viscosity, can flow through the apertures 30 to relieve the pressure drop. In warmer conditions, when the fluid is less viscous, more fluid will tend to flow through the fine media 24. In this example, all fluid always flows through the coarse media 44.

The provision of a plurality of numerous small peripheral apertures 30 can provide a large total bypass area while maintaining a small footprint. For example in same cases a bypass area to outlet area ratio of 1:1 or 1:1.25 may be desired, and this bypass area can be fit conveniently into the periphery of the fine filter element 20. Placing the passive bypass in the form of many small apertures 30 on the periphery of the fine filter element 20 may allow the bypassed fluid to be more evenly distributed around the general flow path of all the fluid, and thus provide a desirable transitional flow characteristic between cold and warm states, as compared to a single large bypass region. Moreover, in the illustrated example the upper and lower housings 12 and 16 retain a compact footprint. As noted above also, many small apertures similar to apertures 30 can be placed in more central rib parts of the fine filter element 20 instead of, or in addition to, apertures 30 around the periphery of the fine filter element 20.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A fluid filter, comprising:
   a housing forming a fluid chamber, the housing comprising at least a bottom shell having an inlet and a top shell having an outlet; and
   a fine media pleat pack disposed in the housing, the fine media pleat pack comprising an inner peripheral frame, an outer peripheral frame, and a fine filter media;
wherein:
   the fine filter media comprises a top surface, a bottom surface, and a plurality of sides;
   the inner peripheral frame comprises sidewalls that are adjacent to and around the plurality of sides of the fine filter media;
   a plurality of ribs are coupled to the inner peripheral frame and are overmolded on the fine filter media, so as to couple the fine filter media to the inner peripheral frame;
   the outer peripheral frame extends around the sidewalls of the inner peripheral frame; and
   a plurality of apertures are present between the outer peripheral frame and the inner peripheral frame, wherein each of the plurality of apertures is at least partly defined by and extends through at least part of the outer peripheral frame, such that when a fluid flow passes from said inlet to said outlet, at least part of said fluid flow always passes through at least one of the plurality of apertures, and at least part of said fluid flow passes through said fine media.

2. The fluid filter of claim 1, wherein:
   the sidewalls of the inner peripheral frame each comprise an inward facing surface facing said fine filter media and an outward facing surface facing away from said fine filter media; and
   the outer peripheral frame comprises a peripheral flange body and a plurality of peripheral flange elements, wherein the plurality of peripheral flange elements extend inwardly from said peripheral flange body and are coupled to the outward facing surface of at least one of the sidewalls of the inner peripheral frame such that each of said plurality of apertures is defined at least in part by at least one of the peripheral flange elements, said inner peripheral frame, and said peripheral flange body.

3. The fluid filter of claim 1, wherein the ribs and sidewalls of the inner peripheral frame are unitary with each other and are formed of the same material.

4. The fluid filter of claim 3, wherein the apertures are disposed at regular intervals between the outer peripheral frame and the inner peripheral frame.

5. The fluid filter of claim 3, wherein the apertures each have a square cross section.

6. The fluid filter of claim 3, wherein the fine media pleat pack is a unitary overmolded pleat pack.

7. The fluid filter of claim 1, wherein the apertures each have a square cross section.

8. The fluid filter of claim 1, wherein the fine media pleat pack is a unitary overmolded pleat pack.

9. The fluid filter of claim 1, further comprising a coarse media element disposed in the housing, the coarse media element comprising a coarse filter medium that is coarser than the fine filter media, the coarse media element being configured such that when a fluid flow passes from said inlet to said outlet, all fluid in said fluid flow passes through the coarse media.

10. The fluid filter of claim 9, wherein the coarse media is a screen.

11. The fluid filter of claim 9, wherein the ribs and sidewalls of the inner peripheral frame are unitary with each other and are formed of the same material.

12. The fluid filter of claim 11, wherein the apertures are disposed at regular intervals between the outer peripheral frame and the inner peripheral frame.

13. The fluid filter of claim 11, wherein the apertures each have a square cross section.

14. The fluid filter of claim 11, wherein the fine filter media element is disposed upstream of the coarse filter media.

15. The fluid filter of claim 1, wherein:
the top shell has a top shell peripheral flange;
the bottom shell has a bottom shell peripheral flange and
the top shell peripheral flange and the bottom shell peripheral flange are attached and sealed together to form the fluid chamber with the fine media pleat pack inside the fluid chamber.

16. The fluid filter of claim 15, wherein the top shell peripheral flange and the bottom shell peripheral flange are attached and sealed together by one of laser welding, gluing, bonding, friction welding, or vibration welding.

17. The fluid filter of claim 15, wherein at least a part of the outer peripheral frame is trapped between the top shell peripheral flange and the bottom shell peripheral flange.

18. The fluid filter of claim 1, wherein the top shell peripheral flange and the bottom shell peripheral flange are attached and sealed together by one of laser welding, gluing, bonding, friction welding, or vibration welding.

19. The fluid filter of claim 1, wherein at least a portion of the outer peripheral frame is trapped between the bottom shell and the top shell.

* * * * *